Oct. 7, 1969
G. W. FLOYD
3,471,852
INCREMENTAL DISPLACEMENT TRANSDUCER CIRCUITS
FOR ERRORLESS COUNTING
Filed Aug. 2, 1965
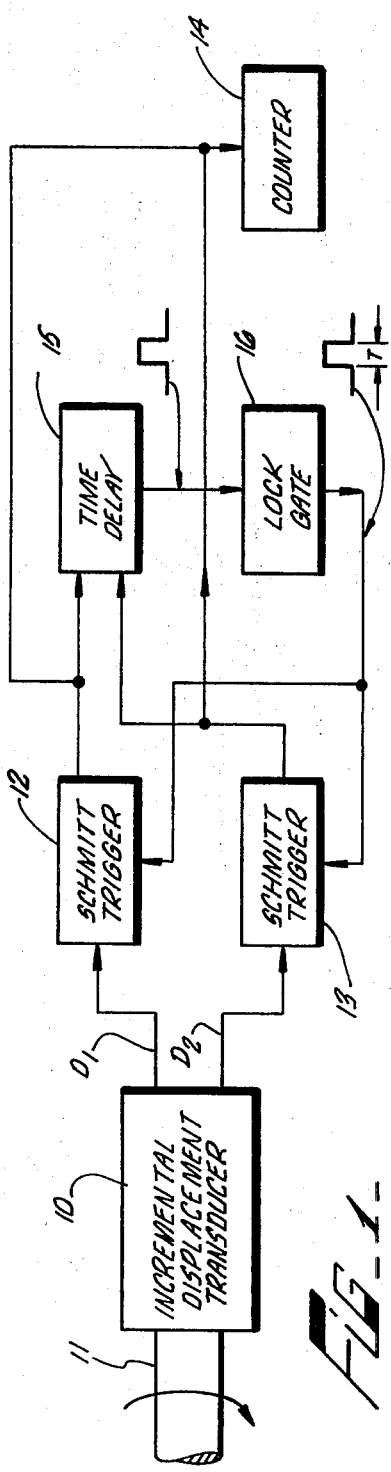
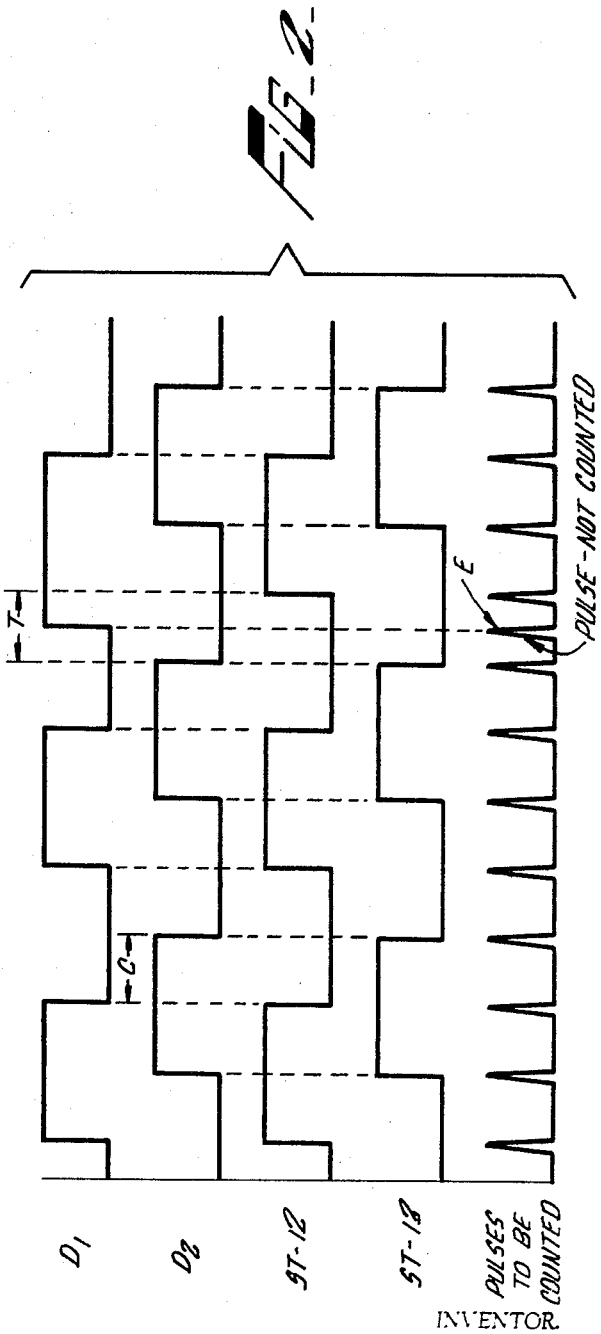
INVENTOR.
GEORGE W. FLOYD
BY
Christie, Parker & Hale
ATTORNEYS.

United States Patent Office 3,471,852
Patented Oct. 7, 1969

3,471,852
INCREMENTAL DISPLACEMENT TRANSDUCER
CIRCUITS FOR ERRORLESS COUNTING
George W. Floyd, Los Angeles, Calif., assignor to Ex-Cell-O Corporation, Detroit, Mich., a corporation of Michigan
Filed Aug. 2, 1965, Ser. No. 476,609
Int. Cl. G08c 9/00, 11/00
U.S. Cl. 340—347     4 Claims

ABSTRACT OF THE DISCLOSURE

The invention is directed to circuits for use with an incremental displacement transducer to eliminate erroneous indications of motion due to phase shifts and the like produced by conventional circuits. The incremental displacement transducer is provided with a locking circuit to lock the usual switching circuits in their states for a preselected interval to render them insensitive to spurious signals and thereby provide only the desired pulses to be counted as an indication of displacement.

This invention relates to an incremental displacement transducer and more particularly to circuits for use with an incremental displacement transducer that provides for errorless counting of the transducer output signals.

Incremental displacement transducers are well known in the art and have been embodied in various physical forms including magnetic and optical transducers. These transducers, in general, provide a pair of signals that are out of phase in response to a change in position of an analog signal to be digitized, such as the rotation of a shaft. The pair of signals that are derived from the incremental displacement transducers should have a time duration related to the preselected increment of displacement to be detected. One prior art transducer that provides such a pair of signals and which transducer is a magnetic incremental displacement transducer is described and claimed in U.S. Patent No. 3,189,890, granted on June 15, 1965.

The pair of signals derived from these incremental displacement transducers are usually applied to a pulse counter, to count the counter up or down in response to the encoder signals. In order to correctly indicate the displacement in terms of a count, the encoder signals must be correctly defined and spaced with regard to the increments of displacement. It has been found that the symmetry and phase shift in the signals derived from an incremental displacement transducer varies from the desired due to power supply variations, the frequency response of the detectors or the circuits utilized therewith, the mechanical alignment of the detectors and the scale element. In optical encoders, in particular, the light intensity variations and the alignment of the optical sensors and any incremental chopper discs with the light source may produce phase shifts in optical encoders. These various shifts cause the edges of the successive signals to approach one another in time, and results in transducing errors particularly at high transducing speeds or when the shaft being digitized is rotated at a relatively high speed. This decrease in the minimum time interval between encoder signals will result in an error in counting of the encoder signals if the pulse rate of these shifted encoder signals exceeds the maximum count rate of the summing counter. Accordingly, it is desirable to provide means to insure errorless counting of the signals from the encoder through the control of the signals applied thereto to assure that the maximum count rate of the counter is not exceeded.

The present invention provides an improved circuit for use with an incremental displacement transducer that is simple and may be readily employed with present day encoders to insure errorless counting. The circuit is advantageously defined to maintain a minimum time interval between signals to be counted to prevent counting errors and thereby lowering the counting speed required for counting.

Structurally, the present invention includes individual circuit means that are connected to the incremental displacement transducer that are switchably responsive thereto to assume a different binary state in response to successive binary signals. The signals provided in the incremental displacement transducer have a predetermined out of phase relationship, preferably a quadrature relationship, and have a preselected minimum time duration.

Connected to receive the output signals from these individual circuit means is a locking circuit means connected to be responsive to the switching signals and providing a locking signal of a preselected time duration related to the maximum count rate of the counter without reference to the speed of the transducer. The locking signal maintains the switching circuits in their new binary state for a predetermined time interval and thereby avoiding an erroneous count. In one specific application, the locking circuit means may comprise a time delay circuit means providing a signal of a preselected time duration for actuating a locking gate coupled to each of the individual switching circuits.

These and other features of the present invention may be more fully appreciated when considered in the light of the following specification and drawings in which:

FIG. 1 is a block diagram of a circuit for use with an incremental displacement transducer to provide errorless counting and embodying the invention; and FIG. 2 is a graphical illustration of the wave forms appearing in the circuit of FIG. 1.

Now referring to the drawings, the invention will be examined in more detail. It should be understood at the outset that the incremental displacement transducer with which the present circuit may be employed may comprehend either an optical, magnetic or any other well-known form of transducer. The important consideration is that the incremental displacement transducer provides a pair of binary signals having a predetermined out of phase relationship, preferably arranged in quadrature, and changing in binary character in response to each preselected increment of displacement detected by the transducer. The average time interval between the binary signals is in accordance with the maximum preselected shaft rotation. The incremental displacement transducer disclosed in the aforementioned U.S. Patent No. 3,189,890 may be referred to as typical of an incremental displacement transducer meeting these specifications. The incremental displacement transducer is illustrated in the drawings in block form, and identified by the reference character 10, and mounted on a rotatable shaft 11. The analog signal to be digitized is represented by the rotation of the shaft 11 and which rotation and displacement is detected by the incremental displacement transducer 10 and provides the pair of quadrature signals therefrom as discussed hereinabove.

The pair of quadrature signals are illustrated in FIG. 2 and are identified as $D_1$ and $D_2$. The encoder signals as derived from the transducer 10 are essentially square waves having an on/off characteristic representative of the two binary states. The time duration of each binary state is preferably equal in accordance with the equal scale divisions normally provided with the incremental displacement transducer. The two encoder signals $D_1$ and $D_2$ are essentially similarly defined and arranged to have a quadrature out of phase relationship, as illustrated.

The individual encoder signals $D_1$ and $D_2$ are coupled to individual switching circuit means, illustrated as the conventional Schmitt triggers 12 and 13. The Schmitt triggers are of conventional construction and essentially amplitude responsive circuits that are maintained in a preselected conductive condition and are switchable in response to a signal having a preselected amplitude to another conductive condition and when the input signal falls below the preselected amplitude, switches back to its other binary state. The encoder signals as processed by the switching circuit means 12 and 13 are derived from the output lead wires of the circuits and are applied to a pulse counter 14. With each change in state of the encoder signals $D_1$ and $D_2$ a pulse to be counted is generated as indicated in FIG. 2. This circuitry is a conventional portion of the counter 14 and is not illustrated. The output signals from the switching circuit means 12 and 13 are also each applied to a time delay circuit 15. The time delay circuit 15 provides an output signal of a preselected time duration related to the maximum count rate of the counter 14. This count rate of the counter 14 is identified in FIG. 2 as the time interval T which in the limiting case is equivalent to C. Stated differently, the output of the time delay circuit 15 causes the encoder signals to have a minimum time duration T for each change in state of the encoder signals $D_1$ and $D_2$. The output of the time delay circuit 15 is applied to a lock gating circuit 16 for actuating the gate during the presence of time delay signals at its input circuit. The lock gate 16, then, provides an output signal in response to the time delay signal that is in turn applied to each of the input circuits for the switchable means 12 and 13. The locking signal is effective to prevent the switching circuits 12 and 13 from changing binary state irrespective of any phase shift or change in the desired characteristic of the encoder signals $D_1$ and $D_2$. When the time delay signal has a time interval T, the corresponding locking signal will assure that the switching circuits 12 and 13 will not switch and provide a signal at a rate in excess of the maximum counting rate of the counter 14.

With the above circuit configuration in mind, the operation of the circuit to illustrate errorless counting can now be better appreciated. It will be assumed that the incremental displacement transducer 10 provides a pair of output signals $D_1$ and $D_2$ in the desired quadrature relationship and that an erroneous pulse E would normally be generated as a result of the shift in time from the desired time increment in the train of $D_1$ signals. As it will be appreciated from examining FIG. 2, this shift in time causes the pulse E of the train of pulses to be counted to occur prior to its normal or desired time. It will also be assumed that with this phase shift, the counter will be pulsed at a rate to cause an error in counting and thereby erroneously indicate the actual position of the shaft 11. The encoder signal $D_2$ will be assumed, as illustrated, to have the desired time and phase relationship and in quadrature with the $D_1$ signal. The output signals from the individual switching circuits 12 and 13 are identified in FIG. 2 as the signals S.T.–12 and S.T.–13, respectively. Assuming, then, that the pulse trains $D_1$ and $D_2$ are applied to the trigger circuits 12 and 13, it will be seen that the counter 14 will normally provide an accurate count for the series of pulses applied thereto prior to the E pulse but that the count including the E pulse would produce an erroneous count. For this purpose, once the trigger circuit 12 has switched its state, the time delay circuit 15 in response thereto will provide an output signal of a time duration T and, accordingly, actuate the gate 16 to provide a locking signal of a time duration T that locks the trigger circuits 12 and 13 in this new binary state for the time interval T. Accordingly, the circuits 12 and 13 will not be allowed to switch their binary state during this locking interval and a new pulse will not be coupled to the counter 14. Upon termination of the locking signal, the switching circuit 12 will switch its binary state in response to a change in shaft position and provide a pulse to the counter 14 in the correct time relationship within the counting capacity of the counter 14 and thereby correctly indicate the increment of displacement by the count of the counter 14. In the same fashion, any further shifts in phase or the like that occur in the encoder signals are corrected by the locking circuit means described to avoid errors in countings.

What is claimed is:

1. In combination, an incremental displacement transducer providing a pair of binary signals having a predetermined out of phase relationship and changing in binary character in response to each preselected increment of displacement, the pair of signals to have a preselected minimum time duration in each binary state, individual switching circuit means comprising Schmitt trigger circuits connected to be responsive to each one of the pair of binary signals and switchable in binary state in response to each increment of displacement, and time delay switching circuit means connected to be responsive to said individual circuit means and having an output circuit connected to each of said circuit means for maintaining each of the circuit means in one binary state for a preselected minimum time interval.

2. In combination, an incremental displacement transducer providing a pair of binary signals having a predetermined out of phase relationship and changing in binary character in response to each preselected increment of displacement, the pair of signals to have a preselected minimum time duration in each binary state, individual binary switching circuit means connected to be responsive to preselected signal amplitude changes corresponding to each preselected increment of displacement to provide a pair of binary signals arranged in a quadrature time relationship, time delay circuit means connected to be responsive to said individual circuit means for providing an output signal of a predetermined time duration in response to each change in binary state provided by said individual switching circuit means, and locking circuit means connected to be responsive to said output signal from said time delay means and providing a locking signal connected to each of said switching circuit means for locking same in one binary state only during the presence of said output signal.

3. A circuit for use with a displacement transducer providing binary output signals in a quadrature relationship representative of predetermined increments of displacement and which output signals are applied to a counter for providing a digital indication, said circuit comprising switching circuit means connected to be switchably responsive to the transducer output signals for providing binary coded signals representative of each increment of displacement for application to a counter, and locking switching circuit means connected to be responsive to said binary coded signals for providing a locking signal of a preselected time duration related to the maximum counting rate of the counter to lock said first mentioned switching circuit means in the changed binary state for said preselected time interval to thereby cause the counter to always indicate the correct count.

4. A circuit for use with a displacement transducer as defined in claim 3 wherein said locking circuit means comprises a time delay circuit connected to be responsive to said first mentioned switching circuit means, and a gating circuit means connected to said time delay circuit.

References Cited

UNITED STATES PATENTS

| | | | |
|---|---|---|---|
| 3,028,589 | 4/1962 | Broadwell | 340—347 |
| 3,088,036 | 4/1963 | Hobbs | 235—92 |
| 3,283,320 | 11/1966 | Blachowicz et al. | 340—347 |
| 3,383,499 | 5/1968 | Laidlaw | 328—58 |

OTHER REFERENCES

Huskey and Korn: Computer Handbook (1962), pp. 11–11 through 11–13.

MAYNARD R. WILBUR, Primary Examiner

JEREMIAH GLASSMAN, Assistant Examiner

U.S. Cl. X.R.

235—92